(12) United States Patent
Messerschmidt

(10) Patent No.: US 7,117,630 B1
(45) Date of Patent: Oct. 10, 2006

(54) HOOK DISLODGING ASSEMBLY

(76) Inventor: Robert L. Messerschmidt, 956 Hawthorne Ave., Janesville, WI (US) 53545

(*) Notice: Subject to any disclaimer, the term of this patent is extended or adjusted under 35 U.S.C. 154(b) by 0 days.

(21) Appl. No.: 11/032,621

(22) Filed: Jan. 11, 2005

(51) Int. Cl.
*A01K 97/18* (2006.01)
(52) U.S. Cl. ...................................................... 43/53.5
(58) Field of Classification Search ................. 43/53.5
See application file for complete search history.

(56) References Cited

U.S. PATENT DOCUMENTS

| | | | | |
|---|---|---|---|---|
| 253,363 | A * | 2/1882 | Foard ........................... | 43/53.5 |
| 1,000,775 | A * | 8/1911 | Buras, Jr. .................... | 43/53.5 |
| 1,577,095 | A * | 3/1926 | Arnold ........................ | 43/53.5 |
| 2,492,799 | A * | 12/1949 | Holland ...................... | 43/53.5 |
| D157,255 | S * | 2/1950 | Hamel ......................... | 43/53.5 |
| 2,561,281 | A * | 7/1951 | Lawrence .................... | 43/53.5 |
| 2,589,976 | A * | 3/1952 | Steele ......................... | 43/53.5 |
| 2,718,082 | A * | 9/1955 | Limacher .................... | 43/53.5 |
| 2,779,123 | A * | 1/1957 | White ......................... | 43/53.5 |
| 2,797,523 | A * | 7/1957 | Dillard ........................ | 43/53.5 |
| 2,828,575 | A | 4/1958 | Neuner et al. | |
| 2,836,003 | A * | 5/1958 | Schumacker ................. | 43/53.5 |
| D191,670 | S * | 10/1961 | Archer ........................ | 43/53.5 |
| 3,008,260 | A * | 11/1961 | Landrum ..................... | 43/53.5 |
| 3,009,280 | A * | 11/1961 | Hunter et al. ................. | 43/53.5 |
| 3,011,286 | A | 12/1961 | Wallace | |
| 3,334,437 | A * | 8/1967 | Sawyer ........................ | 43/53.5 |
| 3,377,735 | A * | 4/1968 | Daughtry ..................... | 43/53.5 |
| 3,451,157 | A * | 6/1969 | Jones .......................... | 43/53.5 |
| 3,555,735 | A * | 1/1971 | Montgomery ................ | 43/53.5 |
| 3,670,448 | A * | 6/1972 | Wehmeyer ................... | 43/53.5 |
| 3,835,574 | A * | 9/1974 | Harwood ..................... | 43/53.5 |
| 3,869,822 | A * | 3/1975 | Tieman ....................... | 43/53.5 |
| 4,014,131 | A * | 3/1977 | Bendik ........................ | 43/53.5 |
| 4,206,561 | A * | 6/1980 | Wong et al. .................. | 43/53.5 |
| 4,882,871 | A * | 11/1989 | Marina ........................ | 43/53.5 |
| 5,084,999 | A * | 2/1992 | Henry .......................... | 43/53.5 |
| 5,138,791 | A * | 8/1992 | Coes ........................... | 43/53.5 |
| 5,307,586 | A * | 5/1994 | Palmer ........................ | 43/53.5 |
| D355,699 | S | 2/1995 | Eggler | |
| 5,421,120 | A * | 6/1995 | Brumfield .................... | 43/53.5 |
| D377,080 | S | 12/1996 | Johnston | |
| 5,644,865 | A | 7/1997 | Harrison et al. | |
| 5,784,830 | A * | 7/1998 | Brumfield .................... | 43/53.5 |
| 5,934,009 | A * | 8/1999 | Trahan ........................ | 43/53.5 |
| 6,526,691 | B1* | 3/2003 | Maddox ...................... | 43/53.5 |
| 6,584,726 | B1* | 7/2003 | Dehm ......................... | 43/53.5 |
| 6,688,034 | B1* | 2/2004 | Mantel ........................ | 43/53.5 |

FOREIGN PATENT DOCUMENTS

| | | | | |
|---|---|---|---|---|
| CA | 748609 | A * | 12/1966 | ................. 43/53.5 |
| FR | 1520675 | A * | 3/1968 | ................. 43/53.5 |
| GB | 10424 | A * | 6/1891 | ................. 43/53.5 |
| GB | 2100102 | A * | 12/1982 | |
| GB | 2300554 | A * | 11/1996 | |

(Continued)

*Primary Examiner*—Darren W. Ark

(57) ABSTRACT

A hook dislodging assembly includes an elongated rod that has a first end and a second end. A tool head is attached to and extends away from the first end. The tool head has a free end, a top side, a bottom side, a first lateral side and a second lateral side. A groove is positioned in the top side and extends through a juncture of the top side and the free end. The groove extends toward the first end of the rod. The tool head may be removably positioned in a mouth of a fish such that a hook in the mouth is positioned in the groove. The hook may be dislodged with the free end.

10 Claims, 3 Drawing Sheets

FOREIGN PATENT DOCUMENTS

JP 11-32644 A * 2/1999
JP 2005-278474 A * 10/2005

* cited by examiner

HOOK DISLODGING ASSEMBLY

BACKGROUND OF THE INVENTION

1. Field of the Invention

The present invention relates to hook engaging devices and more particularly pertains to a new hook engaging device for dislodging a hook from the mouth of a fish.

2. Description of the Prior Art

The use of hook engaging devices is known in the prior art. U.S. Pat. No. 4,206,561 describes a device that includes an elongated slot therein for receiving a hook so that the hook may be removed from a fish. Another type of hook engaging device is U.S. Pat. No. 5,644,865 which includes a partial cylinder which is adapted for receiving fishing line attached to a hook. The cylinder is slid down the line and can be abutted against a hook to dislodge it from a fish. U.S. Pat. No. 5,934,009 describes a tool that has a notch therein for catching a hook and thereby disengaging it from the mouth of a fish.

While these devices fulfill their respective, particular objectives and requirements, the need remains for a device which is capable of disengaging a hook from the mouth of a fish without actually attaching itself to the hook. This will accomplish a plurality of purposes. The fist will be that lures will be protected from being damaged, since the tool will grip any portion of the hook. The second purpose is that it allows the tool to be small since it has no moving parts and will only extend into the mouth as far as the hook. The third purpose is that since the tool only extends as deep as the part, there is less risk of harming the fish during the extraction of the hook.

SUMMARY OF THE INVENTION

The present invention meets the needs presented above by generally comprising an elongated rod that has a first end and a second end. A tool head is attached to and extends away from the first end. The tool head has a free end, a top side, a bottom side, a first lateral side and a second lateral side. A groove is positioned in the top side and extends through a juncture of the top side and the free end. The groove extends toward the first end of the rod. The tool head may be removably positioned in a mouth of a fish such that a hook in the mouth is positioned in the groove. The hook may be dislodged with the free end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
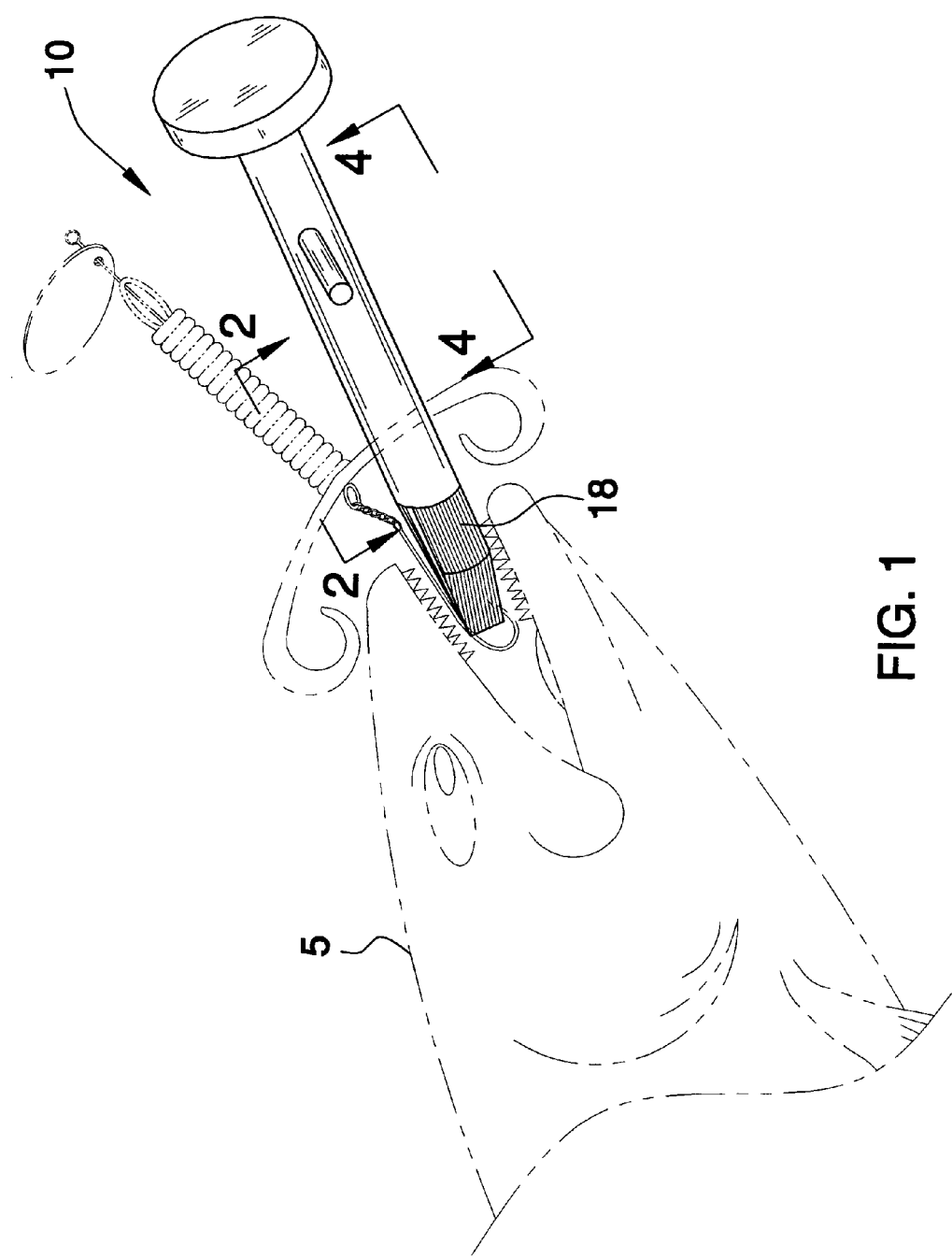
FIG. 1 is a perspective in-use view of a hook dislodging assembly according to the present invention.
Figure 2:
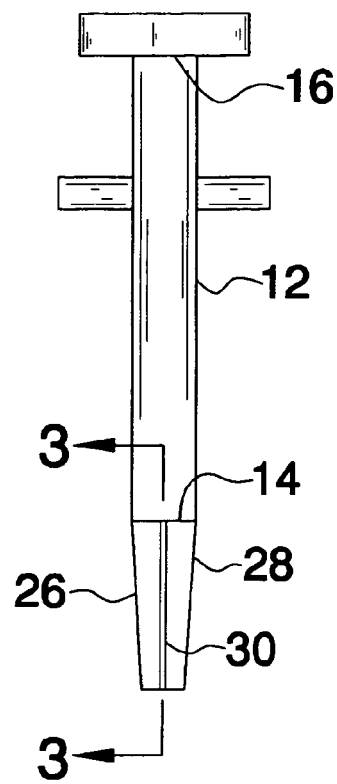
FIG. 2 is a front view of the present invention.
Figure 3:
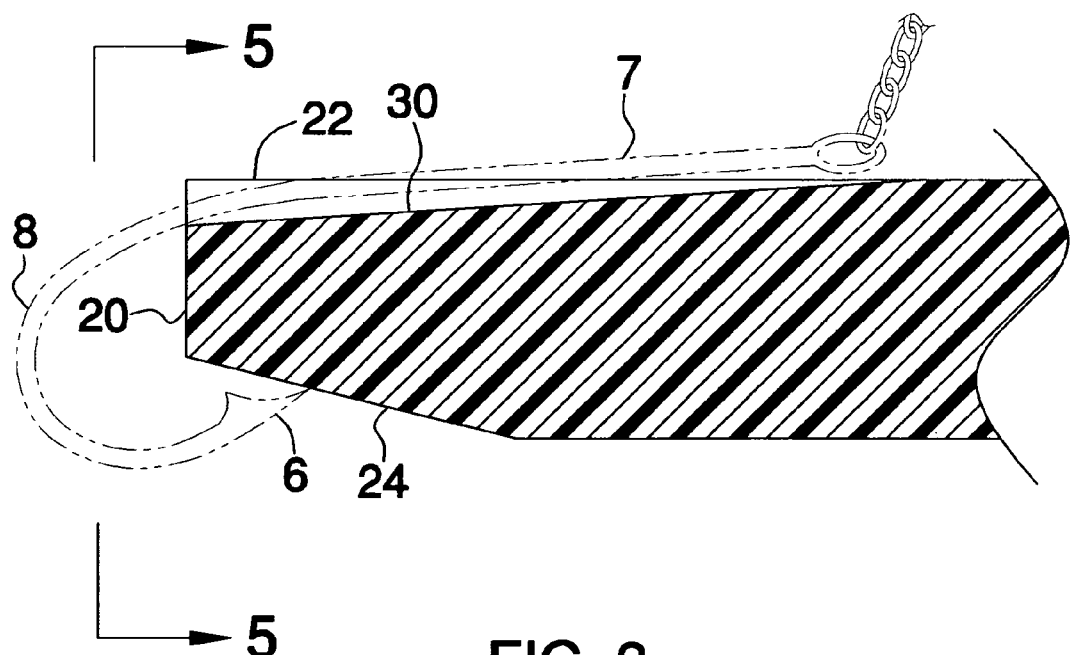
FIG. 3 is a cross-sectional view taken along line 3—3 of FIG. 2 of the present invention.
Figure 4:
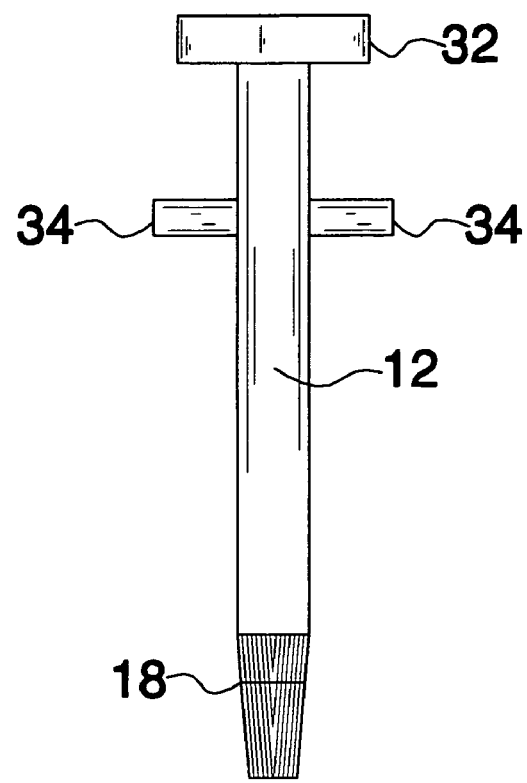
FIG. 4 is a side view of the present invention.
Figure 5:
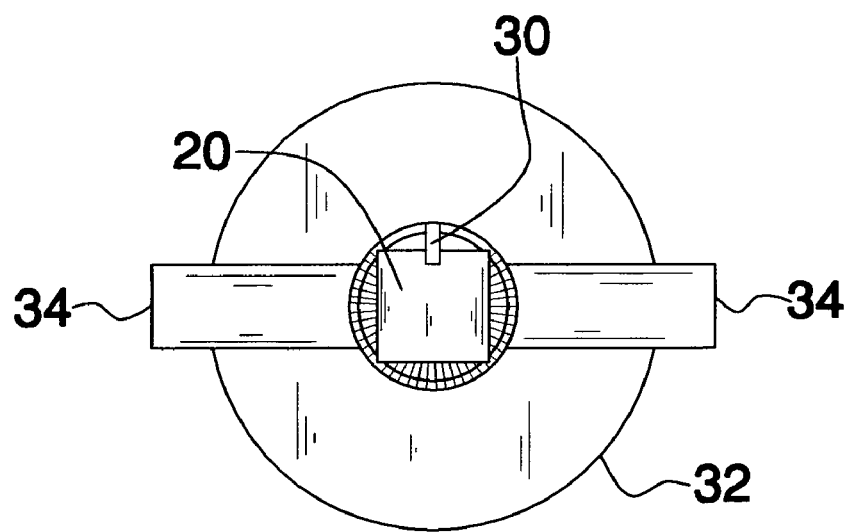
FIG. 5 is a bottom view of the present invention.

With reference now to the drawings, and in particular to FIGS. 1 through 5 thereof, a new hook engaging device embodying the principles and concepts of the present invention and generally designated by the reference numeral 10 will be described.

As best illustrated in FIGS. 1 through 5, the hook dislodging assembly 10 generally comprises an elongated rod 12 that has a first end 14 and a second end 16. A tool head 18 is attached to and extends away from the first end 14. The tool head 18 may be integral with the rod 12. The tool head 18 has a free end 20, a top side 22, a bottom side 24, a first lateral side 26 and a second lateral side 28. A groove 30 is positioned in the top side 22 and extends through a juncture of the top side 22 and the free end 20. The groove 30 extends toward the first end 14 of the rod 12. The groove 30 has a length generally between 1 inch and 2 inches and a width generally between $1/32$ inch and $1/16$ inch. The groove 30 has a depth generally between $1/32$ inch and $1/16$ inch at the free end which decreases from the free end 20 to the first end 14 of the rod 12 and preferably fades away at juncture of the tool head 18 and the rod 12. The free end 20 has width generally between $3/16$ inch and $3/8$ inch, and a height generally between $1/8$ inch and $1/4$ inch. The free end 20 is substantially planar and extends perpendicular to a longitudinal axis of the rod 12. The head 18 preferably tapers down to these dimensions from the first end 14 of the rod 12. The bottom side 24 includes an angled portion terminating at the free end 20, the angled portion being angled upwardly toward the top side 22 such that the groove 30 and the angled portion are inclined toward each other toward the free end 20.

A grip 32 is attached to the second end 16 of the rod 12. The grip 32 includes a circular disc lying in a plane orientated perpendicular to a longitudinal axis of the rod 12. Each of a pair of posts 34 is attached to the rod 12. The posts 34 extend outwardly in opposite directions with respect to each other. The posts 34 are positioned generally between the tool head 18 and the grip 32.

In use, the tool head 18 may be removably positioned in a mouth of a fish 5 by sliding it along a hook 6. The shaft 7 of the hook 6 is held in the groove 30 as this is done. When the user reaches the curve 8 of the hook 6, the free end 20 is abutted against the curve 8 and the hook 6 is urged in a direction opposite of the hook's point. The groove 30 keeps the hook 6 on the tool head 18 so that it does not slide off of the hook 6 and so that the tool head 18 may be used in a very small area where it's user cannot see the free end 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hook dislodging tool assembly comprising:
   an elongated rod having a first end and a second end and a longitudinal axis extending therebetween;
   a tool head being attached to and extending away from said first end, said tool head having a free end, a top side, a bottom side, a first lateral side and a second lateral side, a groove being positioned in said top side and extending through and terminating at a juncture of said top side and said free end, said free end being substantially planar and extending perpendicular to said longitudinal axis of said rod, said groove extending toward said first end of said rod, said groove having a pair of lateral side walls being oriented substantially parallel to each other, a juncture of said bottom side and said free end being continuous, said bottom side including an angled portion terminating at said free end, said angled portion being angled upwardly toward said top side such that said groove and said angled portion are inclined toward each other toward said free end;
   a grip being attached at said second end of said rod, said grip comprising a circular disc lying in a plane orientated perpendicular to said longitudinal axis of said rod;
   a pair of posts, each of said posts being attached to said rod and extending outwardly in opposite directions with respect to each other, said posts being positioned generally between said tool head and said grip; and
   wherein said tool head may be removably positioned in a mouth of a fish such that a hook in the mouth is positioned in the groove, wherein the hook may be dislodged with the free end.

2. The assembly according to claim 1, wherein said groove having a length generally between 1 inch and 2 inches.

3. The assembly according to claim 2, wherein said groove has a width generally between 1/32 inch and 1/16 inch.

4. The assembly according to claim 3, wherein said groove has a depth generally between 1/32 inch and 1/16 inch at said free end.

5. The assembly according to claim 4, wherein said depth of said groove decreases from said free end to said first end of said rod.

6. The assembly according to claim 1, wherein said groove has a depth generally between 1/32 inch and 1/16 inch at said free end.

7. The assembly according to claim 6, wherein said depth of said groove becomes decreases from said free end to said first end of said rod.

8. The assembly according to claim 6, wherein said free end has a width generally between 3/16 inch and 3/8 inch, and a height generally between 1/8 inch and 1/4 inch.

9. The assembly according to claim 1, wherein said free end has a width generally between 3/16 inch and 3/8 inch, and a height generally between 1/8 inch and 1/4 inch.

10. A hook dislodging tool assembly comprising:
    an elongated rod having a first end and a second end and a longitudinal axis extending therebetween;
    a tool head being attached to and extending away from said first end, said tool head having a free end, a top side, a bottom side, a first lateral side and a second lateral side, a groove being positioned in said top side and extending through and terminating at a juncture of said top side and said free end, said free end being substantially planar and extending perpendicular to said longitudinal axis of said rod, said groove extending toward said first end of said rod, said groove having a pair of lateral side walls being orientated substantially parallel to each other, a juncture of said bottom side and said free end being continuous, said bottom side including an angled portion terminating at said free end, said angled portion being angled upwardly toward said top side such that said groove and said angled portion are inclined toward each other toward said free end, said groove having a length generally between 1 inch and 2 inches, said groove having a width generally between 1/32 inch and 1/16 inch, said groove having a depth generally between 1/32 inch and 1/16 inch at said free end, said depth decreasing from said free end to said first end of said rod, said free end having a width generally between 3/16 inch and 3/8 inch, and a height generally between 1/8 inch and 1/4 inch;
    a grip being attached to said second end of said rod, said grip comprising a circular disc lying in a plane orientated perpendicular to said longitudinal axis of said rod;
    a pair of posts, each of said posts being attached to said rod and extending outwardly in opposite directions with respect to each other, said posts being positioned generally between said tool head and said grip; and
    wherein said tool head may be removably positioned in a mouth of a fish such that a hook in the mouth is positioned in the groove, wherein the hook may be dislodged with the free end.

* * * * *